United States Patent
Jurkovic et al.

(10) Patent No.: US 8,847,460 B2
(45) Date of Patent: Sep. 30, 2014

(54) ASYMMETRIC STATOR TEETH IN AN ELECTRIC MOTOR

(75) Inventors: Sinisa Jurkovic, Sterling Heights, MI (US); Xinyu Zhou, Troy, MI (US); Qiang Niu, Novi, MI (US); Khwaja M. Rahman, Troy, MI (US); John C. Morgante, Sterling Heights, MI (US); Xu Han, Novi, MI (US); Edward L. Kaiser, Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 203 days.

(21) Appl. No.: 13/103,158

(22) Filed: May 9, 2011

(65) Prior Publication Data

US 2012/0286613 A1    Nov. 15, 2012

(51) Int. Cl.
*H02K 1/14* (2006.01)
*H02K 1/16* (2006.01)

(52) U.S. Cl.
USPC .............................. 310/216.092; 310/216.096

(58) Field of Classification Search
CPC ........... H02K 1/14; H02K 1/16; H02K 1/146; H02K 2201/03
USPC ............. 310/156.01, 156.08, 156.11, 156.33, 310/156.38, 156.44, 156.45, 156.46, 310/156.48, 216.012, 216.091, 310/216.096–216.097, 216.086, 216.088, 310/216.098, 254.1, 216.092, 310/216.093–216.095

IPC ................................. H02K 1/14,1/16
See application file for complete search history.

(56) References Cited

U.S. PATENT DOCUMENTS

| | | | |
|---|---|---|---|
| 2,802,123 A | 8/1957 | Tweedy et al. | |
| 4,186,316 A | 1/1980 | Singh | |
| 5,418,415 A | 5/1995 | Ishizaki | |
| 5,789,841 A | 8/1998 | Wang | |
| 6,025,668 A | 2/2000 | Kolomeitsev | |
| 6,072,260 A | 6/2000 | Randall | |
| 6,181,047 B1 * | 1/2001 | Nitta | 310/216.001 |
| 6,348,751 B1 | 2/2002 | Jermakian et al. | |
| 6,717,323 B1 | 4/2004 | Soghomonian et al. | |
| 6,822,368 B2 | 11/2004 | Maslov et al. | |
| 7,030,532 B2 | 4/2006 | Kobayashi et al. | |
| 7,211,984 B2 | 5/2007 | Patel et al. | |
| 7,342,339 B2 | 3/2008 | Norell et al. | |
| 7,550,891 B2 | 6/2009 | Kim | |
| 2009/0273245 A1 | 11/2009 | Endo et al. | |
| 2011/0169369 A1 * | 7/2011 | Liang et al. | 310/216.092 |

OTHER PUBLICATIONS

Lee, Joon-Ho; Minimization of Higher Back-EMF Harmonics in Permanent Magnet Motor Using Shape Design Sensitivity with B-Spline Parameterization; IEEE Trans. on Magnetics; vol. 39, No. 3; May 2003.

* cited by examiner

*Primary Examiner* — Michael Andrews

(57) ABSTRACT

A permanent magnet motor includes a permanent magnet rotor, a stator surrounding the rotor having a plurality of teeth radially inwardly oriented toward a longitudinal axis of the stator wherein each tooth has a tooth length and a tooth tip surface geometry. An asymmetric air gap is defined by variations in the tooth lengths and tooth tip surface geometries.

5 Claims, 2 Drawing Sheets

ASYMMETRIC STATOR TEETH IN AN ELECTRIC MOTOR

TECHNICAL FIELD

This disclosure is related to stators for electric motors.

BACKGROUND

The statements in this section merely provide background information related to the present disclosure. Accordingly, such statements are not intended to constitute an admission of prior art.

Known electric motors include permanent magnet electric motors that transform electric power to mechanical torque. Permanent magnet electric motors may be multiphase interior permanent magnet (IPM) electric motors that include an annular stator into which a rotor element is inserted. Known stators include an annular stator core and a plurality of electrical windings. Known stator cores include a plurality of radial inwardly projecting tooth elements that are parallel to a longitudinal axis of the electric motor and define an inner circumference of the stator. Contiguous radial inwardly projecting tooth elements form radially-oriented longitudinal slots. Electrical windings are fabricated from strands of suitable conductive material, e.g., copper or aluminum, and are woven or otherwise arranged into coil groups that are inserted into the radially-oriented slots between the tooth elements. Electrical windings are arranged electrically in series in circular fashion around the circumference of the stator core, with each electrical winding associated with a single phase of the electric motor. Each coil group of the electrical windings provides a single pole of a single phase of motor operation. The quantity of radially-oriented slots in the stator core is determined based upon the quantity of phases and poles of the electrical wiring windings for the electric motor. Thus, a three phase, two-pole induction motor will have electrical windings that are configured as six coil groups, with the coil groups configured in six slots or a quantity of slots that is a multiple of six. Current flow through the electrical windings is used to generate rotating magnetic fields that act on a rotor to induce torque on a shaft of the rotor.

Known rotors for permanent magnet electrical motors include a rotor core attached to a rotating shaft that defines an axis of rotation. Known rotors have a plurality of rotor magnets positioned around the circumference near an outer surface of the rotor core, with each rotor magnet aligned longitudinally with the axis of rotation.

Known permanent magnet electrical motors include an air gap between tooth elements of a stator and an outer surface of a rotor. An air gap is a design feature that is necessary to accommodate manufacturing tolerances, facilitate assembly, and address other known factors. An air gap is preferably minimized, as an increased air gap correlates to reduced magnetic flux and thus reduced output torque.

When electric current flows through the stator windings, a magnetic field is induced along the electrical windings associated with a single phase of the section of the stator that acts upon the rotor magnets of the rotor element. The magnetic field induces torque on the rotating shaft of the rotor. When the magnetic field induces sufficient torque to overcome bearing friction and any induced torque load on the shaft, the rotor rotates the shaft.

In operation, discontinuities in motor torque output including torque ripples are associated with magnitude of an air gap. The air gap and the associated discontinuities in the motor torque output affect maximum motor torque output and affect noise, vibration, and harshness performance of the electric motor.

Design of permanent magnet electric motors includes factors related to magnetic, mechanics, thermodynamics, electronics, acoustics, and material sciences. It is known that performance requirements, packaging constraints and costs impose constraints on motor design that affect design features. Known performance requirements include maximum motor torque output, torque ripple, and cogging torque, which affect noise, vibration, and harshness performance of the electric motor. Known permanent magnet electric motors have flux distribution due to the permanent magnets and the armature magneto-motive forces that is non-sinusoidal with respect to the angular rotor position. The non-sinusoidal flux distribution introduces torque pulsations that are reflected as speed ripple, noise and vibration. Torque pulsations may degrade performance of permanent magnet electric motors and are preferably minimized. Torque pulsations affect performance, including efficiency, audible noise, vibration, and harshness. Effects upon performance vary at different operating points, i.e., torque pulsations may vary in response to operating at different speeds and torque outputs. Known strategies to reduce or minimize torque pulsations include skewing locations of magnets in a rotor to minimize torque ripple, adjusting specific design features of a stator and/or a rotor to achieve a minimum torque ripple or achieve a maximum motor torque output at a specific operating point, and executing control strategies to generate an inverse torque component through the stator current.

SUMMARY

A permanent magnet motor includes a permanent magnet rotor, a stator surrounding the rotor having a plurality of teeth radially inwardly oriented toward a longitudinal axis of the stator wherein each tooth has a tooth length and a tooth tip surface geometry. An asymmetric air gap is defined by variations in the tooth lengths and tooth tip surface geometries.

BRIEF DESCRIPTION OF THE DRAWINGS

One or more embodiments will now be described, by way of example, with reference to the accompanying drawings, in which.

DETAILED DESCRIPTION

Figure 1:
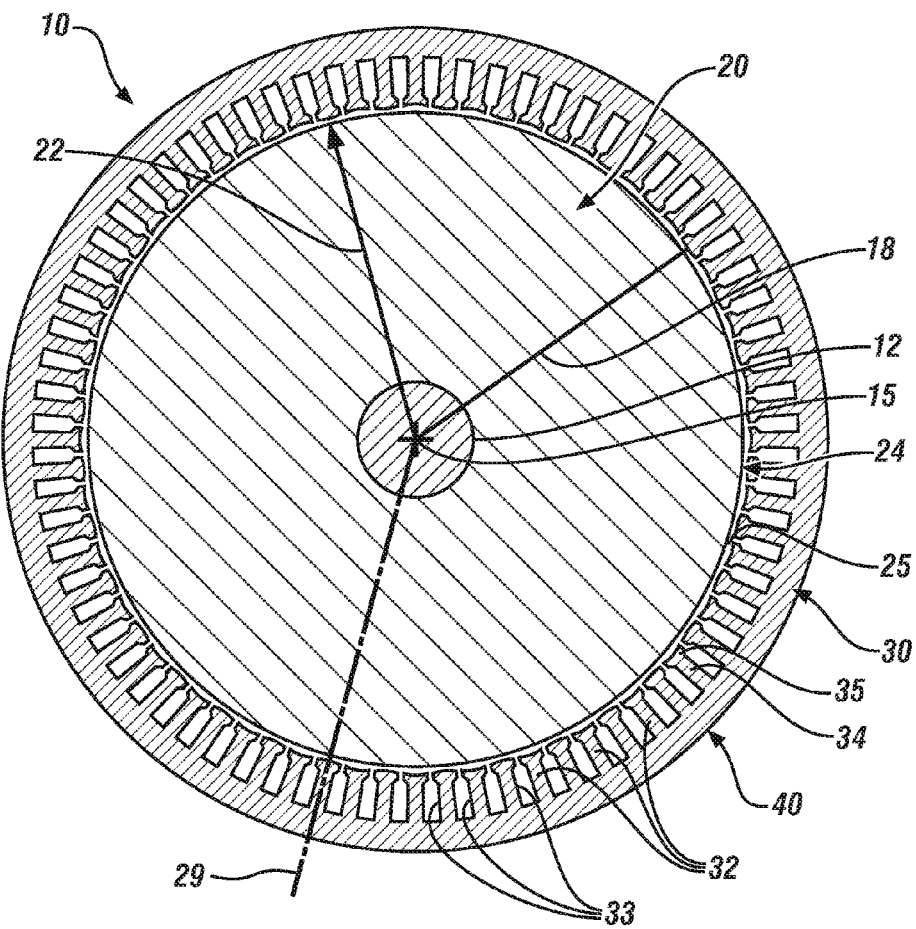
FIG. 1 is a sectional view of an electric motor including a rotor mounted on a shaft and inserted into a hollow cylindrical stator in accordance with the disclosure.
Figure 2:
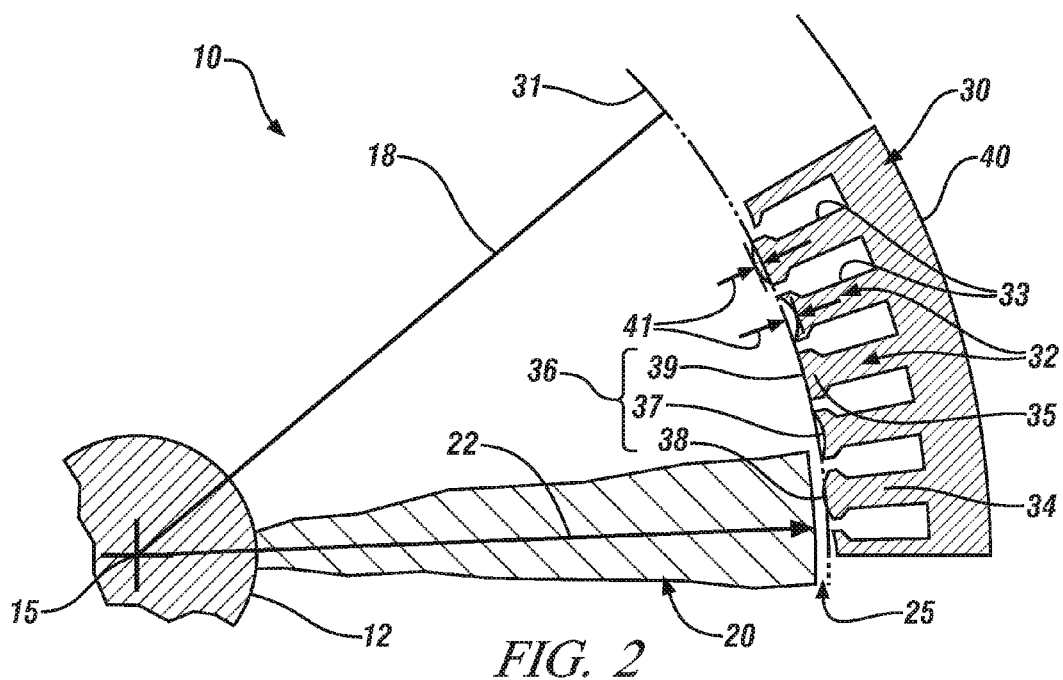
FIG. 2 is a partial sectional view of the electric motor in accordance with the disclosure.

Referring now to the drawings, wherein the showings are for the purpose of illustrating certain exemplary embodiments only and not for the purpose of limiting the same, FIG. 1 is a sectional view of a permanent magnet electric motor 10 including a rotor 20 mounted on a shaft 12 and inserted into a hollow cylindrical stator 30, and FIG. 2 is a partial sectional view of the permanent magnet electric motor 10. The permanent magnet electric motor 10 includes a case having end caps, and the shaft 12 of the rotor 20 is rotatably mounted on bearing surfaces of the end caps. A center line of the shaft 12 defines a longitudinal axis 15 that is an axis of rotation of the rotor 20 as well as a longitudinal axis of the stator 30. The cross-sectional view of the permanent magnet electric motor 10 is shown orthogonal to the longitudinal axis 15. Salient features of the electric motor are described primarily in relation to a cross-sectional view orthogonal the longitudinal axis 15. A portion of an ideal circle 31 is shown. The ideal circle 31 is coaxial with the longitudinal axis 15 with a radius defined by a radial line segment 18 projecting orthogonally from the longitudinal axis 15 in the plane of the orthogonal cross-section. The radius defined by the radial line segment 18 approximates a mean inside radius of the stator 30. It is appreciated that the longitudinal axis 15, the radial line segment 18, and the ideal circle 31 are geometric constructs used to describe elements of the permanent magnet electric motor 10 and their relative orientations, and are not physical elements thereof.

The rotor 20 includes an outer surface 24 having an outer radius 22. The rotor 20 includes shaft 12 and a plurality of permanent magnets circumferentially placed near the outer surface 24.

The stator 30 includes a plurality of circumferentially disposed radially, inwardly oriented stator teeth 32 such that each tooth includes a radial centerline passing through the longitudinal axis 15. Adjacent stator teeth 32 form radially, inwardly open slots. The slots 33 project in directions that are parallel to the longitudinal axis 15 of the stator 30. Insulated electrical windings are inserted into the slots 33. In one embodiment, the slots 33 are rectangularly-shaped conduits.

Each of the radially, inwardly oriented teeth 32 is substantially symmetrical with respect to its radial centerline 29 and includes a cross-sectional profile including a body portion 34 and an end portion or tooth tip 35. Each end portion 35 is substantially wider than the corresponding body portion 34 for the tooth 32. Each end portion 35 is distal to and radially inward of an outer periphery 40 of the stator 32. Each end portion 35 has a radially inward inner surface portion 36. Each of the radially inward inner surface portions 36 has a surface configuration that is one of a concave arcuate surface 37, a convex arcuate surface 38, and a flat surface 39. Each tooth 32 may be characterized in terms of a radial length 41 and the radially inward inner surface portion 36 of its end portion 35. The radial length 41 describes the radial projection of the end portion 35, and is preferably measured between the point of intersection on the respective inner surface with the respective radial centerline and the ideal circle 31. Alternatively, the radial length may measured between the point of intersection on the respective inner surface with the respective radial centerline and the outer periphery 40 of the stator 32.

An air gap 25 is formed between the outer surface 24 of the rotor 20 and the inner surface portions 36 of the end portions 35 of the radially, inwardly oriented teeth 32 of the stator 30. The air gap 25 is defined with reference to a radial distance between the stator 30 and the rotor 20. It is appreciated that the magnitude of the air gap 25 varies with variations in the radial lengths 41 of the inwardly-projecting teeth 32, with a minimum magnitude of the air gap 25 associated with a maximum magnitude of the radial length 41 and a maximum magnitude of the air gap 25 associated with a minimum magnitude of the radial length 41.

The stator 30 is configured having an asymmetric circumferential pattern or distribution of the teeth 32 with regard to the surface portion 36 and the radial length 41. This asymmetric circumferential pattern of the teeth 32 results in an asymmetric variation in the air gap 25 that preferably achieves a reduction in torque ripple across a range of motor operating points. The asymmetric circumferential pattern of the teeth 32 to achieve the asymmetric variation in the air gap 25 is achieved with an asymmetric distribution of the radially-oriented inner surface portions 36 including the concave arcuate surface 37, the convex arcuate surface 38, and the flat surface 39 to achieve a plurality of selected radial lengths 41 having magnitudes between a maximum radial length and a minimum radial length.

Figure 3:
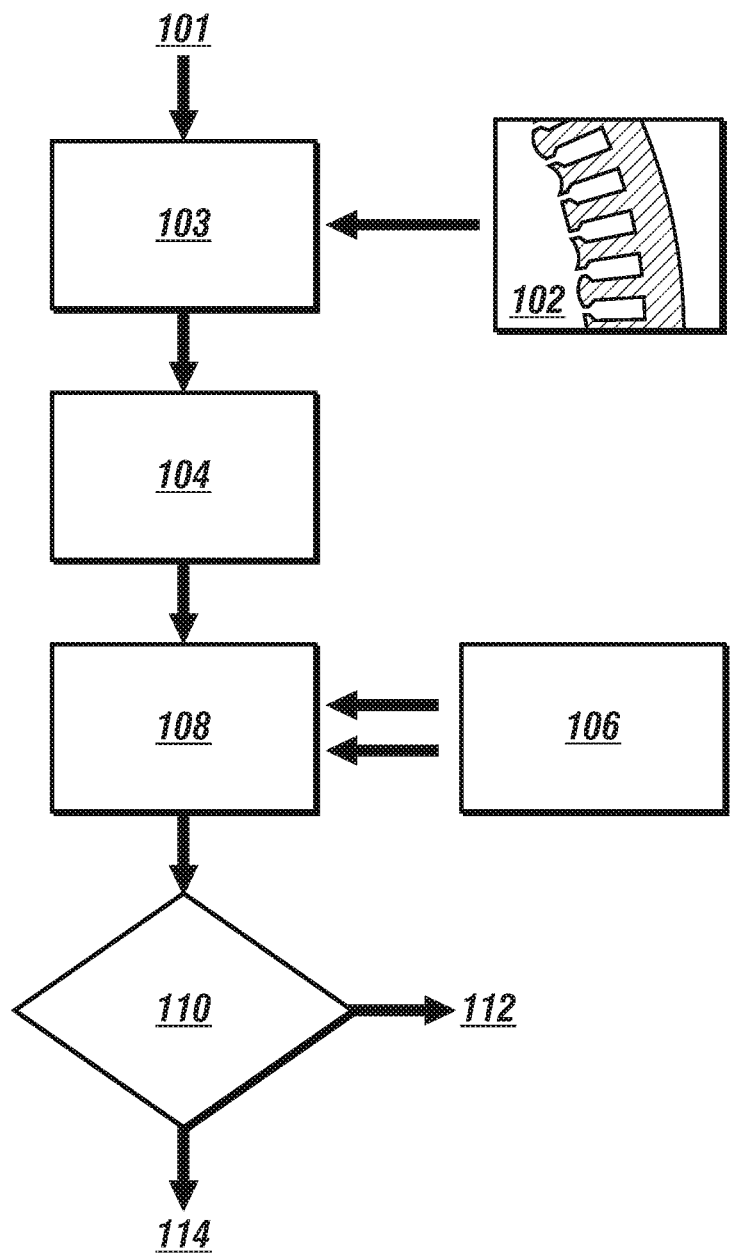
FIG. 3 is a flowchart of a process to select a preferred asymmetric circumferential pattern of teeth for a stator for an electric motor in accordance with the disclosure.

FIG. 3 describes a process 100 in flowchart form for designing a stator for a permanent magnet electric motor. The process 100 is described with reference to the permanent magnet electric motor 10 described with reference to FIG. 1. The process 100 is preferably iteratively executed to asymmetrically distribute the surface portions 36 and the selected radial lengths 41 for the teeth 32 in a manner that minimizes torque ripple across a range of operating points for the stator 30 of the permanent magnet electric motor 10 and maximizes an average torque output.

Table 1 is provided as a key wherein the numerically labeled blocks and the corresponding functions are set forth as follows.

TABLE 1

FIG. 3

| BLOCK | BLOCK CONTENTS |
|---|---|
| 101 | Start |
| 102 | Develop parameterized geometry of Motor |
| 103 | Define input variables |
| 104 | Execute Finite Element Analysis of Motor for selected Geometry |
| 106 | Define motor operating points; Define objectives and constraints |
| 108 | Execute optimization algorithm |
| 110 | Validate results |
| 112 | Go to Start |
| 114 | End |

The process 100 includes defining input variables (103) and developing a parameterized geometry of the permanent magnet electric motor 10 including the rotor 20 mounted on the shaft 12 and inserted into the hollow cylindrical stator 30 based upon the input variables (102). Preferred input variables for developing the parameterized geometry of the permanent magnet electric motor 10 include a selected surface portion 36 of the end portion 35 and a selected radial length 41 for each of the teeth 32. The surface portion 36 of the end portion 35 and the radial length 41 are selected for each of the teeth 32. The selected surface portion 36 of the end portion 35 is one of the concave arcuate surface 37, the convex arcuate surface 38 and the flat surface 39.

A finite element analysis model (FEA model) of the permanent magnet electric motor 10 is generated for the selected geometry and takes into consideration the parameterized geometry elements (104), preferably using known finite element analysis techniques.

Operating points for the permanent magnet electric motor 10 and operating parameters, objectives and constraints are defined (106). Operating points for the permanent magnet electric motor 10 preferably include rotational speed, stator current and a control angle. The operating points associated with the rotational speed include a plurality of motor speed points selected from a range between a maximum motor speed and a minimum motor speed, which may be at or near zero. The operating points associated with the rotational speed preferably include motor speed points that are in a first rotational direction and a second rotational direction, i.e., in clockwise and counter-clockwise directions.

The operating points associated with the electrical current include a plurality of electrical current points selected from a range between a maximum current and a minimum current, which may be at or near zero. The electrical current may be associated with both a charging current and a discharging current.

The operating points associated with the control angle may include a plurality of control angle states selected from a range between a maximum control angle and a minimum control angle, which may be at or near zero. Operating constraints preferably include an average torque output from the permanent magnet electric motor 10 at a prescribed operating point defined in terms of the motor speed, the electrical current and the control angle. Operating parameters preferably include a torque ripple, which is determined at the prescribed operating point. Operating objectives preferably include achieving a minimum torque ripple while achieving an average torque output that is greater than a minimum average torque output at the prescribed operating point.

An optimization algorithm is executed using the FEA model of the permanent magnet electric motor 10, taking into consideration the parameterized geometry elements (108). Executing the optimization algorithm preferably includes simulating operation of the FEA model of the permanent magnet electric motor 10 at each of the defined operating points of rotational speed, stator current and control angle taking into consideration the parameterized geometry elements. States for the operating parameters of the average torque output and the torque ripple are determined at each of the defined operating points. This is an iterative process, with the optimization algorithm executed to evaluate asymmetric combinations of the parameterized geometry elements of interest including asymmetric distributions of selected ones of the surface portions 36 for the teeth 32 and asymmetric distributions of selected radial lengths 41 for the teeth 32. An example optimization algorithm is a combinatorial optimization. An exemplary combinatorial optimization asymmetrically distributes selected ones of the surface portions 36 for the teeth 32 and asymmetrically distributes radial lengths 41 between a maximum radial length and a minimum radial length for each of the teeth 32, operates the FEA model of the permanent magnet electric motor 10 with the asymmetrically distributed surface portions 36 and radial lengths 41, determines average torque output and the torque ripple at each of the defined operating points, and converges to a preferred asymmetric circumferential pattern of the selected surface portions 36 and a preferred asymmetric circumferential pattern of selected radial lengths 41 for the teeth 32. The preferred asymmetric circumferential pattern of the parameterized geometry elements of interest is selected. The preferred asymmetric circumferential pattern is the asymmetric combination of the parameterized geometry elements that achieves a minimum torque ripple and maximizes the average torque output at each of the defined operating points.

The preferred asymmetric circumferential pattern of the parameterized geometry elements of interest includes the selected ones of the surface portions 36 for the teeth 32 and the selected radial lengths 41 for the teeth 32. This preferred asymmetric circumferential pattern of the teeth 32 results in an asymmetric variation in the air gap 25 that achieves a reduction in the torque ripple across a range of motor operating points.

The results of the FEA model and the execution of the optimization algorithm are validated (110) to ensure that none of the constraints were violated and to verify that there is integrity in the asymmetric combinations of selected ones of the surface portions 36 for the teeth 32 and asymmetric combinations of selected radial lengths 41 for the teeth 32.

A design configuration for an embodiment of the permanent magnet electric motor 10 may be fabricated that provides the preferred asymmetric circumferential pattern of selected ones of the surface portions 36 for the teeth 32 and preferred asymmetric circumferential pattern of selected radial lengths 41 for the teeth 32 that achieves a minimum torque ripple and maximizes the average torque output at each of the defined operating points.

The depicted embodiment includes a cylindrically-configured rotor housed within an annular stator having the features described herein. It is appreciated that the concepts described herein apply to a cylindrically-configured stator having the features described herein and housed within an annular rotor.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A permanent magnet motor, comprising:
   a permanent magnet rotor mounted on a shaft having a center line defining a longitudinal axis, said rotor including an outer surface co-axial with said longitudinal axis;
   a stator surrounding the rotor, said stator comprising a plurality of teeth radially inwardly oriented toward the longitudinal axis, each tooth having a tooth length and a tooth tip surface geometry, wherein the plurality of teeth are distributed in a preferred asymmetric circumferential pattern with respect to an ideal inside radius of the stator based on variations in both the tooth length and the tooth tip surface geometry of each tooth, and wherein the preferred asymmetric circumferential pattern is selected using a model simulating operation of the permanent magnet motor based upon:
      a plurality of motor operating points defined for the permanent magnet motor, each motor operating point including a respective motor rotational speed selected from a rotational speed operating range between a lower motor rotational speed limit and an upper motor rotational speed limit for the permanent magnet motor, a respective electrical current of the stator selected from an electrical current operating range between a lower electrical current limit and an upper electrical current limit for the permanent magnet motor and a respective control angle selected from a control angle range between a lower control angle limit and an upper control angle limit for the permanent magnet motor,
      a plurality of teeth combinations each comprising a plurality of teeth asymmetrically circumferentially distributed with respect to the ideal inside radius, wherein each combination comprises a different variation in both the tooth length and the tooth tip surface geometry of each tooth, and
      an average torque output value and a torque ripple value determined at each motor operating point for each of the teeth combinations, wherein the preferred asymmetric circumferential pattern corresponds to the teeth combination that achieves a minimum torque ripple value while achieving an average torque output that is greater than a minimum average torque output at each of the motor operating points; and an asymmetric air gap defined by a radial distance between the outer surface of the rotor and a radially inward inner surface portion of each tooth tip surface geometry, said radial distance having an asymmetric variation between minimum and maximum magnitudes based on the preferred asymmetric circumferential pattern of teeth.

2. The permanent magnet motor of claim 1 wherein each tooth tip surface geometry comprises a respective one of concave, convex and flat geometries, and further wherein each of said concave, convex and flat geometries is found on at least one tooth tip surface.

3. A permanent magnet motor, comprising:
a permanent magnet rotor including an outer surface;
a stator surrounding the rotor, said stator comprising a plurality of teeth radially inwardly oriented toward a longitudinal axis of the stator;
each tooth comprising a respective tooth tip distal to an outer periphery of the stator and radially inward thereof;
each tooth tip comprising a respective tooth tip surface facing the rotor, wherein each respective surface is one of concave, convex and flat, and further wherein each of said concave, convex and flat surfaces is found on at least one tooth tip;
each tooth comprising a respective radial length providing a radial projection of the respective tooth tip surface with respect to an ideal inside radius of the stator;
the plurality of teeth distributed in a preferred asymmetric circumferential pattern with respect to the ideal inside radius of the stator based on variations in both the tooth tip surface and the radial length of each tooth, wherein the preferred asymmetric circumferential pattern is selected using a model simulating operation of the permanent magnet motor based upon:
a plurality of motor operating points defined for the permanent magnet motor, each motor operating point including a respective motor rotational speed selected from a rotational speed operating range between a lower motor rotational speed limit and an upper motor rotational speed limit for the permanent magnet motor, a respective electrical current of the stator selected from an electrical current operating range between a lower electrical current limit and an upper electrical current limit for the permanent magnet motor and a respective control angle selected from a control angle range between a lower control angle limit and an upper control angle limit for the permanent magnet motor,
a plurality of teeth combinations each comprising a plurality of teeth asymmetrically circumferentially distributed with respect to the ideal inside radius, wherein each combination comprises a different variation in both the tooth tip surface and the radial length of each tooth, and
an average torque output value and a torque ripple value determined at each motor operating point for each of the teeth combinations, wherein the preferred asymmetric circumferential pattern corresponds to the teeth combination that achieves a minimum torque ripple value while achieving an average torque output that is greater than a minimum average torque output at each of the motor operating points; and
an asymmetric air gap defined by a radial distance between the outer surface of the rotor and the tooth tip surface of each tooth tip, the radial distance having an asymmetric variation between minimum and maximum magnitudes based on the preferred asymmetric circumferential pattern of teeth.

4. A permanent magnet motor, comprising:
a permanent magnet rotor mounted on a shaft having a center line defining a longitudinal axis, said rotor including an outer surface co-axial with said longitudinal axis;
a stator comprising a plurality of teeth radially inwardly oriented toward the longitudinal axis;
each tooth having a cross-sectional profile including a body portion and an end portion, each end portion having a surface portion comprising one of a concave arcuate surface, a convex arcuate surface, and a flat surface;
each tooth having with a tooth-specific radial length relative to an ideal circle having a center at the longitudinal axis;
the plurality of teeth are distributed in a preferred asymmetric circumferential pattern respect to the ideal circle based on variations in both the surface portion and the radial length of each tooth, wherein the preferred asymmetric circumferential pattern is selected using a model simulating operation of the permanent magnet motor based upon:
a plurality of motor operating points defined for the permanent magnet motor, each motor operating point including a respective motor rotational speed selected from a rotational speed operating range between a lower motor rotational speed limit and an upper motor rotational speed limit for the permanent magnet motor, a respective electrical current of the stator selected from an electrical current operating range between a lower electrical current limit and an upper electrical current limit for the permanent magnet motor and a respective control angle selected from a control angle range between a lower control angle limit and an upper control angle limit for the permanent magnet motor,
a plurality of teeth combinations each comprising a plurality of teeth asymmetrically circumferentially distributed with respect to the ideal inside radius, wherein each combination comprises a different variation in both the surface portion and the radial length of each tooth, and
an average torque output value and a torque ripple value determined at each motor operating point for each of the teeth combinations, wherein the preferred asymmetric circumferential pattern corresponds to the teeth combination that achieves a minimum torque ripple value while achieving an average torque output that is greater than a minimum average torque output at each of the motor operating points; and
an asymmetric air gap defined by a radial distance between the outer surface of the rotor and the surface portion of each tooth tip, the radial distance having an asymmetric variation between minimum and maximum magnitudes based on the preferred asymmetric circumferential pattern of teeth.

5. The permanent magnet motor of claim 4, wherein each tooth specific radial length varies between a maximum radial length associated with the minimum magnitude of the asymmetric air gap and a minimum radial length associated with the maximum magnitude of the asymmetric air gap.

* * * * *